US008321498B2

(12) United States Patent
Maes (10) Patent No.: US 8,321,498 B2
(45) Date of Patent: Nov. 27, 2012

(54) POLICY INTERFACE DESCRIPTION FRAMEWORK

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1332 days.

(21) Appl. No.: 11/070,317

(22) Filed: Mar. 1, 2005

(65) Prior Publication Data

US 2006/0212574 A1   Sep. 21, 2006

(51) Int. Cl.
G06F 15/16 (2006.01)
G06F 7/04 (2006.01)
(52) U.S. Cl. .......................................... 709/203; 726/5
(58) Field of Classification Search .................. 709/200, 709/224, 229; 713/153, 168; 726/4; 707/1
See application file for complete search history.

(56) References Cited

U.S. PATENT DOCUMENTS

| | | | |
|---|---|---|---|
| 5,414,812 A | 5/1995 | Filip et al. | |
| 5,613,060 A | 3/1997 | Britton et al. | |
| 5,699,513 A | 12/1997 | Feigen et al. | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A | 12/2000 | Ejiri | |
| 6,192,414 B1 | 2/2001 | Horn | |
| 6,230,271 B1 | 5/2001 | Wadlow et al. | |
| 6,272,556 B1 | 8/2001 | Gish | |
| 6,275,857 B1 | 8/2001 | McCartney | |
| 6,336,138 B1 | 1/2002 | Caswell et al. | |
| 6,374,305 B1 | 4/2002 | Gupta et al. | |
| 6,466,984 B1 | 10/2002 | Naveh et al. | |
| 6,496,864 B1 | 12/2002 | McCartney | |
| 6,553,108 B1 | 4/2003 | Felger | |
| 6,578,159 B1 | 6/2003 | Kitagawa et al. | |
| 6,611,812 B2 | 8/2003 | Hurtado et al. | |
| 6,748,570 B1 | 6/2004 | Bahrs et al. | |
| 6,792,605 B1 | 9/2004 | Roberts et al. | |
| 6,813,278 B1 | 11/2004 | Swartz et al. | |
| 6,868,413 B1 | 3/2005 | Grindrod et al. | |

(Continued)

FOREIGN PATENT DOCUMENTS

EP          2 034 748 A1    3/2009
WO    WO 2007134468 A1    11/2007

OTHER PUBLICATIONS

Scott Seely, "XML and Web Services Security: Understanding WS-Security", Microsoft Corporation, 2002.*

(Continued)

Primary Examiner — Shirley Zhang
(74) Attorney, Agent, or Firm — Kilpatrick Townsend & Stockton LLP (57) ABSTRACT

Methods, systems, and machine-readable mediums are disclosed for providing resource interface descriptions with policy parameters. In one embodiment, a method comprises intercepting, at a framework, a request for a resource interface description. The resource interface description is obtained at the framework and at least one policy associated with the resource is determined. For each of the determined policies, one or more policy parameters associated with the policy are determined.

8 Claims, 6 Drawing Sheets

U.S. PATENT DOCUMENTS

| | | |
|---|---|---|
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,089,317 B2 | 8/2006 | Jeyaraman et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,092 B1 | 11/2006 | Gregorat |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1* | 9/2007 | Hannel et al. .................. 709/200 |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,316 B2 | 1/2011 | Rhodes et al. |
| 7,873,716 B2 | 1/2011 | Maes |
| 7,925,727 B2 | 4/2011 | Sullivan et al. |
| 8,023,971 B2 | 9/2011 | Egli |
| 8,032,920 B2 | 10/2011 | Maes |
| 8,068,860 B1 | 11/2011 | Midkiff |
| 8,073,810 B2 | 12/2011 | Maes |
| 8,090,848 B2 | 1/2012 | Maes |
| 8,161,171 B2 | 4/2012 | Maes |
| 8,214,503 B2 | 7/2012 | Maes |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1* | 10/2002 | Han et al. ...................... 707/513 |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1* | 3/2003 | Atwal et al. ................... 709/328 |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0208539 A1 | 11/2003 | Gildenblat et al. |
| 2003/0217044 A1* | 11/2003 | Zhang et al. ...................... 707/3 |
| 2003/0229760 A1 | 12/2003 | Doyle et al. |
| 2003/0229812 A1* | 12/2003 | Buchholz ...................... 713/202 |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0139319 A1* | 7/2004 | Favazza et al. ................ 713/168 |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1* | 4/2005 | Boubez et al. ...................... 707/1 |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1* | 6/2005 | Flurry et al. ................... 709/238 |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1* | 10/2005 | Edery et al. ..................... 713/153 |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267645 A1 | 12/2005 | Bailey |
| 2006/0014688 A1 | 1/2006 | Costa et al. |
| 2006/0021010 A1* | 1/2006 | Atkins et al. ...................... 726/5 |
| 2006/0031559 A1 | 2/2006 | Sorokopud et al. |
| 2006/0036689 A1 | 2/2006 | Buford et al. |
| 2006/0041669 A1* | 2/2006 | Bemmel et al. ................ 709/229 |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0118662 A1 | 5/2007 | Vishwanathan et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |

| | | |
|---|---|---|
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0233883 A1 | 10/2007 | De Lutiis et al. |
| 2007/0239866 A1 | 10/2007 | Cox et al. |
| 2007/0271554 A1* | 11/2007 | Fletcher et al. ............... 717/147 |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0080479 A1 | 4/2008 | Maes |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0185772 A1 | 7/2010 | Wang et al. |
| 2010/0192004 A1 | 7/2010 | Bauchot et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2012/0045040 A1 | 2/2012 | Maes |
| 2012/0047506 A1 | 2/2012 | Maes |
| 2012/0173745 A1 | 7/2012 | Maes |

OTHER PUBLICATIONS

Anne Thomas Manes, "Registering a Web Service in UDDI," 2003.*
Maes, Stephanie, Multi-modal Web IBM Position W3C/WAP Workshop, IBM Research Human Language Technologies, downloaded http://www.w3.org on May 26, 2003, 9 pages.
Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.
Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.
U.S. Appl. No. 11/024,160, filed Dec. 27, 2004, Maes.
Liberty Architecture Overview, Liberty Alliance Project Version 1.1, Piscataway New Jersey, Jan. 15, 2003, 44 pages.
Parlay APIs 4.0, Parlay X Web Services White Paper, The Parley Group: Parlay X Working Group, Dec. 16, 2002, 12 pages.
*Policy-Based Management* Tom Sheldon's Linktionary, downloaded http://www.lintionary.com/p/policy.html on Aug. 2, 2004, 4 pages.
Andrews, Tony et al.; Business Process Execution Language for Web Services, Version 1.1.; BEA Systems, International Business Machines Corporation, Microsoft Corporation, SAP AG, Siebel Systems, May 5, 2003, 31 pages.
Simpson et al, Java Product Review—Oracle EDA Suite, Dec. 4, 2006, Open Source Magazine, pp. 1-10.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999. filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.

U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
Romellini, C. et al., "CCXML: The Power of Standardization," Loquendo, Sep. 27, 2005.
The Parlay Group, "Specifications", <http://web.archive.org/web/20050114014707/www.parlay.org/specs/index.asp>, Jan. 14, 2005, 2 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Final Office Action mailed Jan. 24, 2011, 16 pages.
U.S. Appl. No. 10/855,999, filed May 28, 2004, Final Office Action dated Jan. 5, 2011, 19 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
International Search Report and Written Opinion of PCT/US2010/037074 mailed Jun. 1, 2011, 17 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/969,343, filed Jan. 4, 2008, Office Action mailed Jun. 10, 2011, 13 pages.
U.S. Appl. No. 12/019,335, filed Jan. 24, 2008, Office Action dated May 23, 2011, 18 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/544,484, filed Aug. 20, 2009, Office Action dated Jun. 3, 2011, 6 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 6, 2007, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.

U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299. filed Jan. 24, 2008, Final Office Action mailed Aug. 25, 2011, 20 pages.
Author Unknown, "Assuming Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en__us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
Author Unknown, "Assuring Quality of Experience for IPTV—White Paper," Heavy Reading, Jul. 2006, 18 pages.
U.S. Appl. No. 11/848,347, filed Aug. 31, 2007, Notice of Allowance mailed Mar. 2, 2012, 9 pages.
U.S. Appl. No.11/951,500, filed Dec. 6, 2007, Office Action mailed Apr. 11, 2012, 6 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.

* cited by examiner

POLICY INTERFACE DESCRIPTION FRAMEWORK

BACKGROUND OF THE INVENTION

A wide variety of resources are made available over networks, such as the Internet. Each of these resources may provide an interface that specifies the operations performed by the resource and the parameters used to perform the operations. Application or application developers that wish to access or use a service provided by a resource need to obtain the resource interface in order to use and access the resource.

One popular method used to making resources available to others is through web services. A web service is a collection of one or more operations which are published and made available on the Internet. A description of the public interface to the web service is generally provided in a Web Services Description Language (WSDL) document, which describes the operations provided by the web service, the input parameters used by the web service, and output parameters which may be returned by an operation. A resource may publish its interface in a WSDL document using a Universal Description Discovery and Integration (UDDI) register.

Other prior art approaches to interoperability of services provided by resources are also used. For instance, the Parlay framework (http://www.parlay.org) specifies a centralized framework for discovering and supporting service enablers. Upon authentication of a requestor, a service enabler is instantiated and made available to the requestor. However, the framework was developed prior to and independently from web services and therefore it does not, for example, cater for providing the Parlay framework functionality to generic web services. The Parlay framework is fundamentally a session-based approach where services are instantiated upon request and then protected by hiding its address for the duration of the instantiation. Further, Parlay requires skilled developers to use an IIOP framework or a CORBA architecture and develop appropriate interfaces for each service enabler or service. Composing such interfaces is not simple, thus the adoption of this approach for determining the availability and the enforceability of supporting functions is limited.

Prior art approaches do not contemplate independent service function composition, combination, aggregation, choreography, or coordination in any way that would allow a resource provider to control and manage efficiently the way that it exposes its resource to other parties in a way that can be automated, where the requestor can determine the conditions that it must satisfy to access and use the enabler or the services and can satisfy them. Further, the existing approaches do not contemplate the service provider validating that these conditions as well as any additional conditions internally imposed and not exposed to the requestor, have been satisfied.

BRIEF SUMMARY OF THE INVENTION

Methods, systems, and machine-readable mediums are disclosed for providing resource and policy interface descriptions. In one embodiment, the method comprises intercepting, at a framework, a request for a resource interface description. The request is associated with a requester. The resource interface description is obtained at the framework. By way of example, the resource interface description may be obtained from a register (e.g., a Universal Description Discovery and Integration (UDDI) register or other type of catalog directory) associated with the resource.

The method also comprises determining at least one policy associated with the resource. By way of example, a policy may be an authentication policy, a billing policy, a prioritization policy, an authorization policy or other type of policy applied to requests to use or access the resource. For each of the determined policies, one or more policy parameters associated with the determined policy are determined. The resource interface description and the policy parameters are then transmitted to the requester. In one embodiment, the resource interface description and the policy parameters may be transmitted by modifying the resource interface description to include the policy parameters and transmitting the modified resource interface description to the requester.

In a second embodiment, a method is disclosed which comprises intercepting, at a framework, a communication from a resource to register a resource description with a register. At least one policy associated with the resource is determined at the framework. For each of the determined policies, one or more policy parameters associated with the determined policy are determined. A policy parameter may be an authentication credential, account information used for charging, or other type of parameter needed to enforce a policy. The resource interface description and the policy parameters are transmitted to the register.

In a third embodiment, a system that may be used to provide resource and policy interface descriptions is disclosed. The system includes a communications interface to intercept a request from a requester for a resource interface description. The system also includes logic to obtain the resource interface description and to determine at least one policy associated with the resource. The logic also determines one or more policy parameters associated with each of the determined policies. The communications interface is further configured to transmit the resource interface description and the policy parameters to the requester.

In a fourth embodiment, a system is disclosed which comprises a communications interface to intercept a communication from a resource to register a resource description with a register. The system further comprises logic to determine at least one policy associated with the resource and to determine one or more policy parameters associated with each of the determined policies. The communications interface is further configured to transmit the resource interface description and the policy parameters to the register.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Frameworks for allowing a resource provider to control and manage the way that it exposes its resource to other parties are disclosed in application Ser. No. 10/856,588, entitled "Method and Apparatus for Supporting Service Enablers via Service Request Composition", filed on May 28, 2004 and application Ser. No. 10/855999, entitled "Method and Apparatus for Supporting Service Enablers Via Service Request Handholding", the details of both of which are hereby incorporated by reference. The frameworks may be used to enforce policies (e.g., authorization, authentication, billing, and Service Level agreement policies) on requests to use or access resources. Methods and systems that may be used to enforce policies defined by a resource are also disclosed in application Ser. No. 11/024,160, entitled "Policies as Workflows", filed Dec. 27, 2004, the details of which are also hereby incorporated by reference.

As previously described, a resource may have an interface which defines the operations performed by the resource, input parameters used, output parameters returned, or other information on how to interact with the resource. When the resource is protected by a policy framework, additional parameters and information may also be required by one or more of the policies enforced on requests to use or access the resource. These policies may be invoked by the policy framework and may each have their own interface description separate from the resource interface description which describes the parameters that must be supplied by a user in order to execute or satisfy the policy. Applications or application developers may need both the resource interface description and the policy interface description(s) to determine all the parameters needed to request use or access of the resource.

Figure 1:
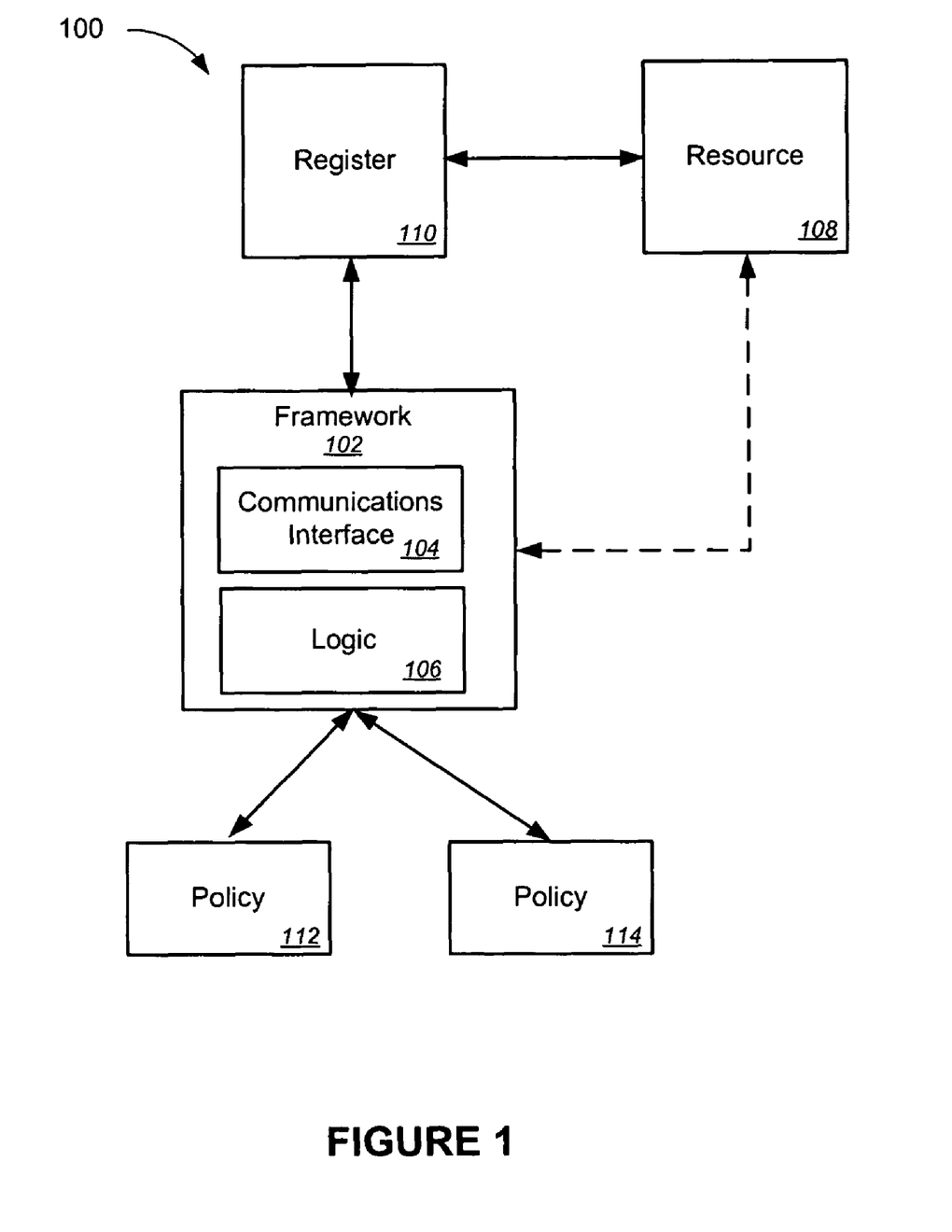
FIG. 1 illustrates an exemplary embodiment of a system that may be used to provide resource interface descriptions and policy parameters.

FIG. 1 illustrates a system that may be used to provide both resource interface descriptions and policy interface descriptions to a requesting party. The system 100 includes a framework 102. Framework 102 includes a communications interface 104 communicatively coupled with logic 106. By way of example, communications interface 104 may be an interface that may be used to send and receive Internet communications, such as web services communications (e.g., SOAP messages). Logic 106 may be one or more software programs, one or more components of a software program (e.g., function or program object), firmware, or other type of machine-executable instructions.

Framework 102 is communicatively coupled with resource 108 and register 110. Resource 108 may be any type of resource, such as an application or function, providing services or functionality to client requesters. Resource 108 may publish a description of its interface with register 110. The resource interface description may describe the operations or services provided by the resource 108, input parameters used to perform the operations or services and/or output parameters returned by the resource 108. The resource interface description may then be used by an application or application developer to make use of the services or functionality provided by resource 108. In one embodiment, resource 108 may be a web service and the register 110 may be a UDDI register.

Framework 102 may further be communicatively coupled with one or more policies 112, 114. The owner of resource 108 may define the policies 112, 114 to be applied to communications to use or access resource 108. By way of example, policies 112, 114 may be authorization policies, authentication policies, prioritization policies, or billing (e.g., rating and charging) policies. Policies 112, 114 may be programs, program components, or other type of machine-executable instructions that may have a logical combination of conditions to be satisfied and actions to be executed to enforce policies on communications to resource 108. In one embodiment, policies 112, 114 may be program objects, such as BPEL objects. In an alternative embodiment, policies 112, 114 may be web services. It should be appreciated that any number of policies may be associated with resource 108. In some cases, the policies 112, 114 that are applied may vary depending upon the requester or type of request. It should also be appreciated that policies 112, 114 may also apply to additional resources.

As will be described in further detail below, in one embodiment, communications interface 104 may be used to intercept requests from a requester to obtain a resource interface description. Logic 106 may then be used to obtain the resource interface description. By way of example, logic 106 may obtain resource interface description from register 110, resource 108, a data storage associated with framework 102, or another location. Logic 106 may also be used to determine policies 112, 114 associated with resource 108 and in some instances, policies applicable to the specific requester requesting the resource interface description. Once the applicable policies are determined, parameters associated with the determined policies 112, 114 may also be obtained by logic 106. For instance, the parameters may be obtained by requesting policy interface descriptions from policies 112, 114 or examining the policies 112, 114 to determine the parameters that need to be provided by a requester. Communications interface 104 may then be used to transmit both the resource interface description and the policy parameters to the requester. Thus, framework 102 may be used to provide both the resource interface description and the policy parameters, which may be needed to be provided to resource 108 during use or access of its services.

In another embodiment, framework 102 may provide both the resource interface description and the policy parameters by intercepting a communication from resource 108 to register the resource interface description with register 110. Framework 102 may determine the applicable policies and associated policy parameters. The complete description, including the resource interface description and policy parameters, may then transmitted to the register 110, which may return the complete information upon request by a requester to obtain the resource interface description.

In some cases, framework 102 may also be used to enforce policies 112, 114 to communications to access or use resource 108. Framework 102 may thus be used as a gateway or proxy for resource 108. Further details of policy enforcement may be found in application Ser. No. 11/024,160, entitled "Policies as Workflows", filed Dec. 27, 2004, previously incorporated by reference.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that communications interface 104, logic 106, resource 108, register 110 and policies 112, 114, may reside on the same or different physical devices and may be components of one or more program applications. It should be also appreciated that system 100 may contain additional or fewer components that that described in FIG. 1. For instance, additional resources may be communicatively coupled with framework 102. As another example, the system 100 may not include register 110. In these embodiments, the resource interface description may be obtained from resource 108 or other component.

Figure 2:
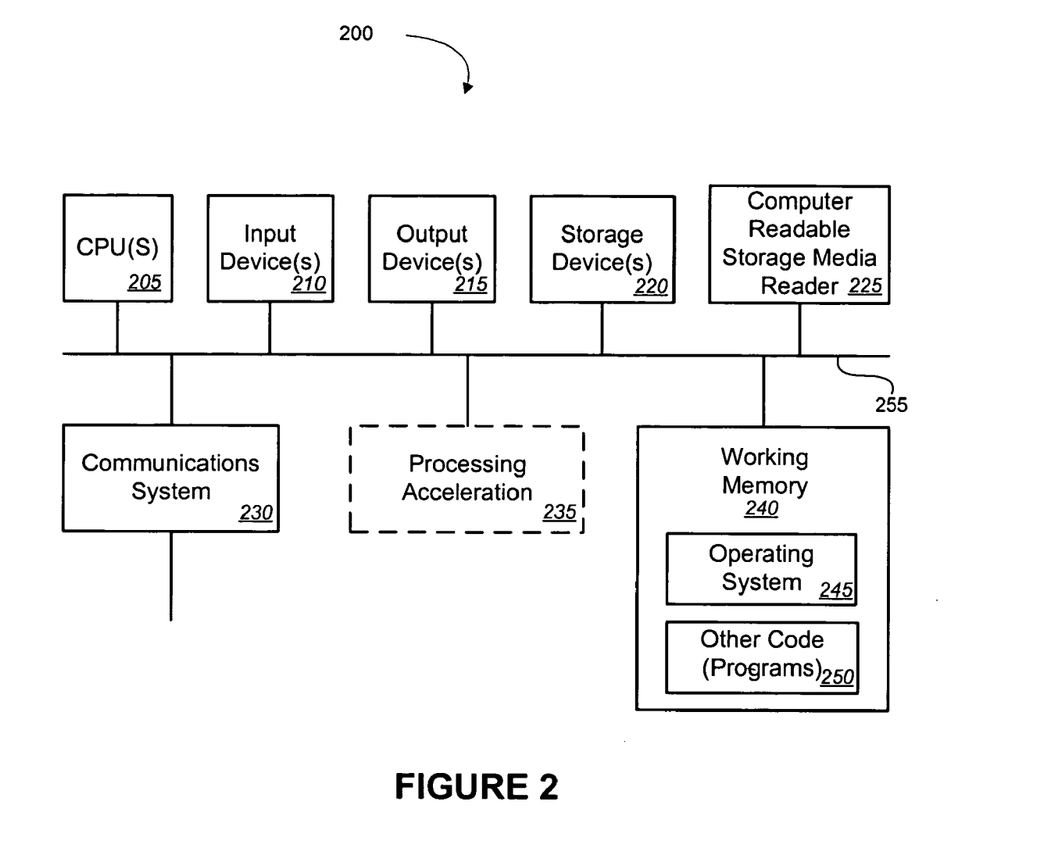
FIG. 2 is a block diagram of an exemplary computer system upon which the framework of FIG. 1 may be implemented.

FIG. 2 illustrates one embodiment of a computer system 500 upon which a framework 102 may be implemented. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer.

The computer system 200 may also comprise software elements, shown as being currently located within a working memory 240, including an operating system 245 and/or other code 250, such as an application program. The application programs may implement a framework, components of a framework, and/or the methods of the invention. It should be appreciate that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
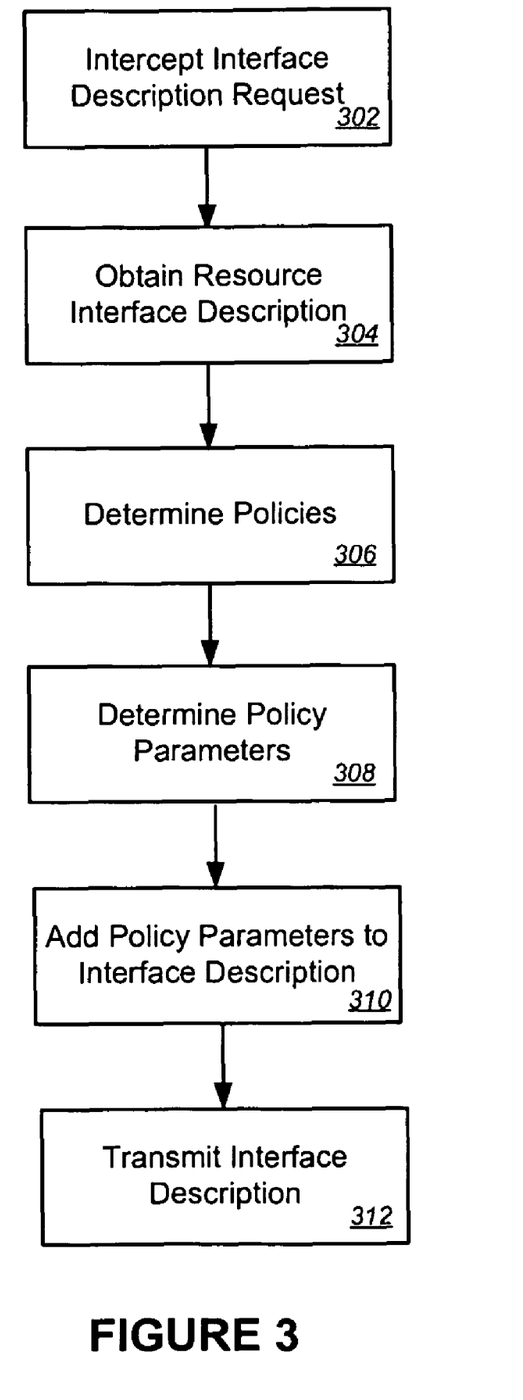
FIG. 3 is a flow diagram illustrating an exemplary method that may be used to provide policy parameters and resource interface descriptions.

FIG. 3 illustrates an exemplary method that may be used by a framework to provide policy parameters and resource interface descriptions to a requester. A framework (e.g., gateway or proxy) may intercept 302 a request for a resource interface description. In one embodiment, the request may be a web services discovery request. Other types of resource interface descriptions may also be intercepted 302.

The framework may then obtain 304 the resource interface description. For example, the resource interface description may be obtained 304 from a register associated with the resource, such as a Universal Description Discovery and Integration (UDDI) register. Alternatively, the framework may obtain 304 the resource interface description from the resource, a data storage associated with the framework, or other location.

One or more policies associated with the resource may then be determined 306. The determined policies may be policies that are enforced on communications to use or access the resource. For example, the policy may be an authentication policy that may require a parameter, such as a token or certificate or other type of authentication credential, to authenticate a user. As another example, the policy may be a billing policy that may need parameters (e.g., requester id, communication type, or account information) to determine how a user is charged for use of services provided by the resource. Other types of policies (e.g., authorization, prioritization, etc.), which may have been specified by the resource to enforce on communications to the resource, may also be determined 306 to be associated with the resource and/or specific requester.

A variety of methods may be used to determine 306 the associated policies. For instances, a data storage may be consulted to determine policies associated with the resource. Optionally, the data storage may also indicate requesters to which the policies are applicable. In another embodiment, a policy specified by the resource to be applied to discovery messages may be invoked. The invoked discovery message policy may then be used to determine 306 associated policies and policy parameters 308 for the determined policies. Other methods may also be used to determine 306 policies associated with resource 306.

For each of the policies determined 306 to be associated with the resource (and optionally, the requester), one or more policy parameters associated with the determined policy may be determined 308. The policy parameters may be parameters used by the policy to enforce the policy. By way of example, the policy parameters may be determined 308 by requesting and obtaining policy interface descriptions from the respective policy. Alternatively, the policy parameters may be obtained from a policy register, a data storage associated with the framework, or other location.

The complete interface description describing parameters used to process communications to the resource, including both the resource interface description and the policy parameters, may then be transmitted 312 to the requester. In one embodiment, the resource interface description and policy parameters may be transmitted 312 by passing the original interface description and a description of the policy parameters relative to the interface description. In some cases, the descriptions may be transmitted 312 as separate messages. Alternatively, the descriptions may be transmitted 312 in one message (e.g., a web services discovery response message). Thus, the framework may modify the obtained 304 resource interface description to include the policy parameters or create a new message with the combined information to create an updated interface description. In some aspects, the policy parameters may be transmitted in a message header (e.g., a SOAP message header) and the resource interface description may be transmitted in the message body (e.g., the SOAP message body). Alternative methods of transmitting 312 the resource interface description and policy parameters may also be used.

It should be appreciated that a number of variations may be made to the method described above to provide a complete interface description to a requester. In one embodiment, the request for the resource interface description may be sent to the register for satisfaction and the framework may be used to transmit the policy parameters. Other variations are also contemplated.

Figure 4:
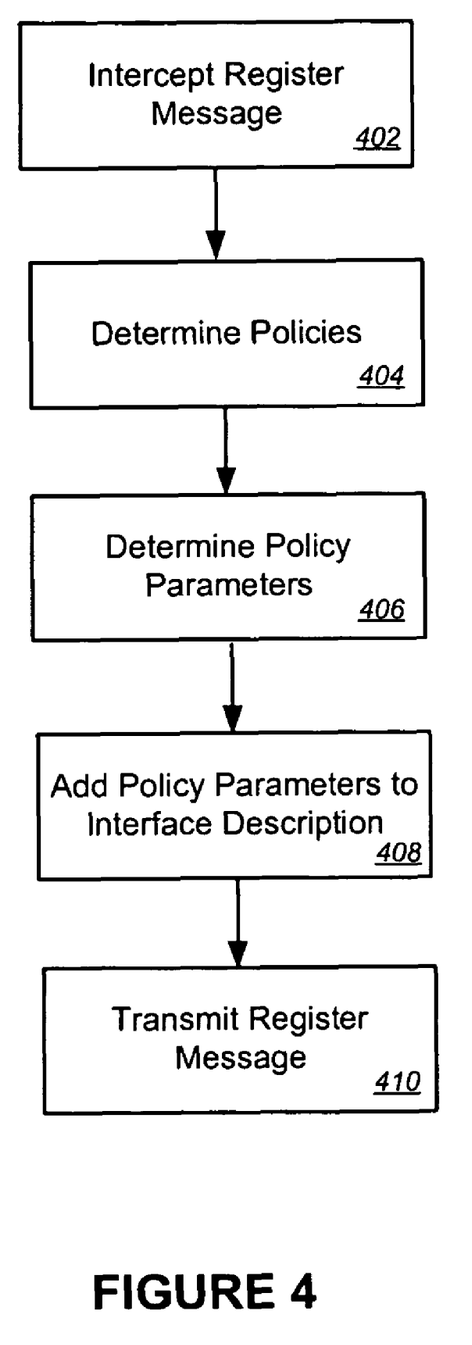
FIG. 4 is a flow diagram illustrating an exemplary method that may be used to include policy parameters in a resource interface description.

FIG. 4 is a flow diagram illustrating an exemplary method that may be used to include policy parameters in a resource interface description. The framework may intercept 402 a communication from a resource to register its resource description with a register associated with the resource. By way of example, the resource may be a web service and the register may be a UDDI register.

As described with reference to FIG. 3, the framework may then use any of a variety of methods to determine 404 policies associated with the resource and to determine 406 policy parameters associated with each of the determined policies. The policy parameters may then be added 408 to the resource interface description and the register message may be transmitted 410 to the register. For instances, the policy parameters may be added to a header of a SOAP message transmitted to the register. Alternatively, the policy parameters may not be added 408, but instead a separate communication with the policy parameters may be created or an additional communication may be sent to the register.

In the embodiment described above, the policy parameters were included in the resource interface description stored in a register associated with the resource. In some embodiments, if the policy parameters change, the framework may update the register with the changes. Similarly, the framework may also update the register if the policies specified by the resource change.

Figure 5:
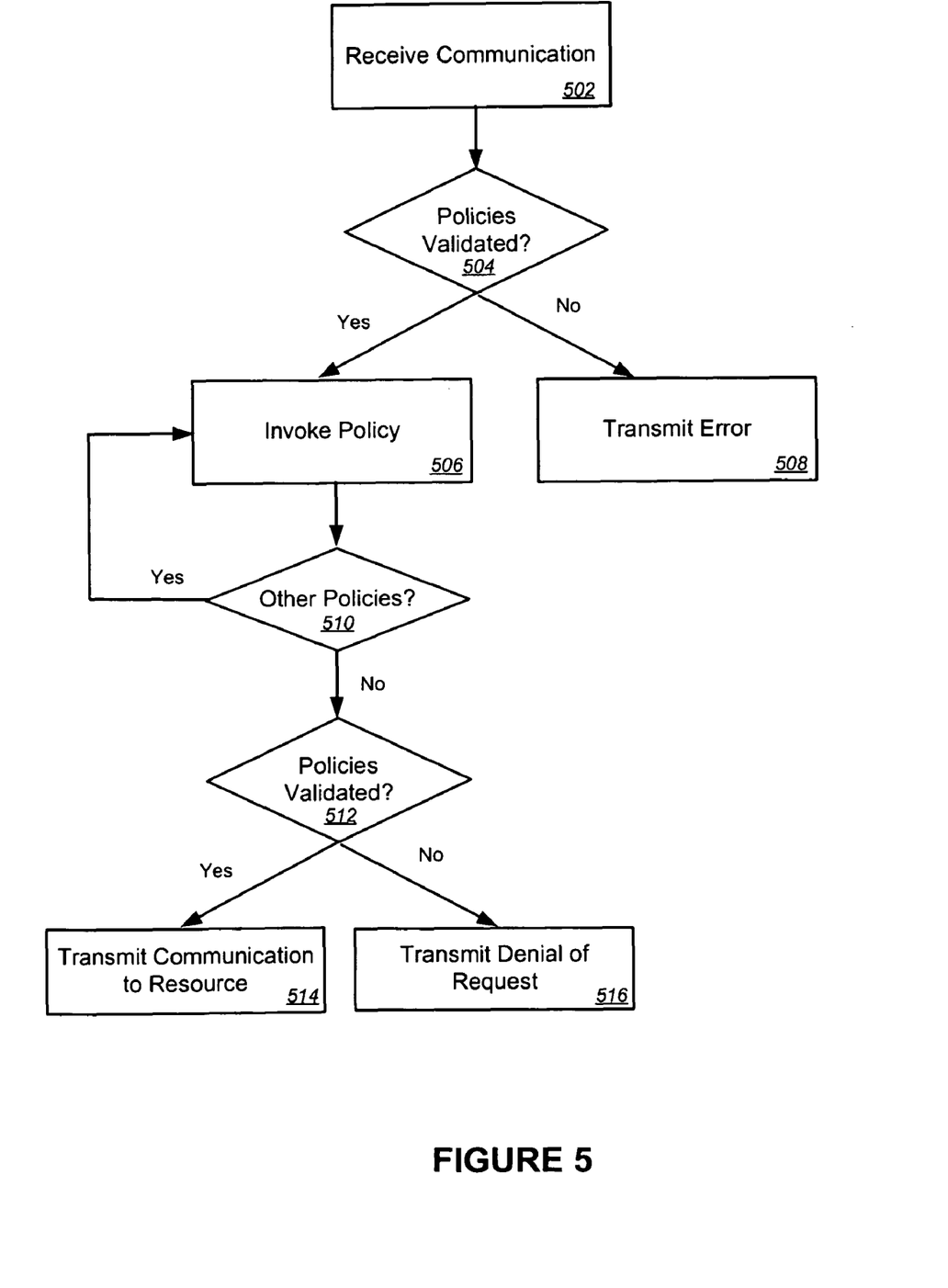
FIG. 5 is a flow diagram illustrating an exemplary method that may be used to enforce policies on a communication.

FIG. 5 illustrates an exemplary method that may be used to enforce policies on a communication to a resource. The policies may be enforced by a framework, such as framework 102, or other type of gateway or proxy to a resource. The method may begin by receiving 502 a communication, such as a SOAP message.

A determination 504 may then be made whether all the policy parameters to be invoked on the communication have been provided. The determination 504 may be made by consulting information indicating the policies to invoke and the parameters needed to invoke the respective policy. Alternatively, the determination 504 may be made separately before invoking 506 the policy or the determination 504 may be made upon receipt of an error message from an invoked 506 policy.

If the communication is missing any policy parameters, the framework may transmit 508 an error in response to the communication. In an alternate embodiment, if any of the policy parameters are missing, the framework or policy may transmit a communication to the requester requesting the missing policy parameter. As another alternative, the framework may transmit a policy interface description describing the policy parameters for the policies missing parameters (and optionally, additional policies to be invoked 506) or may transmit a complete resource interface description using a method similar to that described in FIG. 1.

If there are no required policy parameters missing, a policy to be enforced on the communication is then invoked 504. By way of example, policy may be invoked 504 by making a program call to a function, object, or other program. In one embodiment, the policy may be a BPEL policy which is invoked by executing a statement in the format<invoke policy="policy id">. Parameters may also be specified in the invocation call. In another embodiment, the policy may be a web services.

Other policies 506 may also be enforced against the communication. For example, policies may be applied to authenticate a user or to authorize a user to access a service. These additional policies are also invoked 504. In some embodiments, policies may be invoked simultaneously, such as by execution as part of a BPEL flow. Policies may also be invoked sequentially. As previously described, before invoking additional policies, a determination 504 may be made for the respective policy on whether there are any parameters that are needed to enforce the policy.

The invoked policies may return a result indicating whether the policy completed successfully. The result is examined to determine whether the policy is validated 508. If all the policies complete successfully, the policies are validated ant the communication may be transmitted 510 to the billable resource. If not, a denial of the communication request may be transmitted 512 to the communication initiator. In some embodiments, an attempt to recover from a failed validation may be performed first. For instances, program code specified in a fault handler may be executed. By way of example, the program code may perform actions to obtain additional funds from the communication initiator if the billing policy failed because of insufficient funds. Other types of error recovery may also be performed. In some instances, a later sequenced policy may not be invoked if a prior policy did not complete successfully. Thus, if any critical policies fail to be validated, processing may continue at block 512 without invoking any additional policies.

Figure 6:
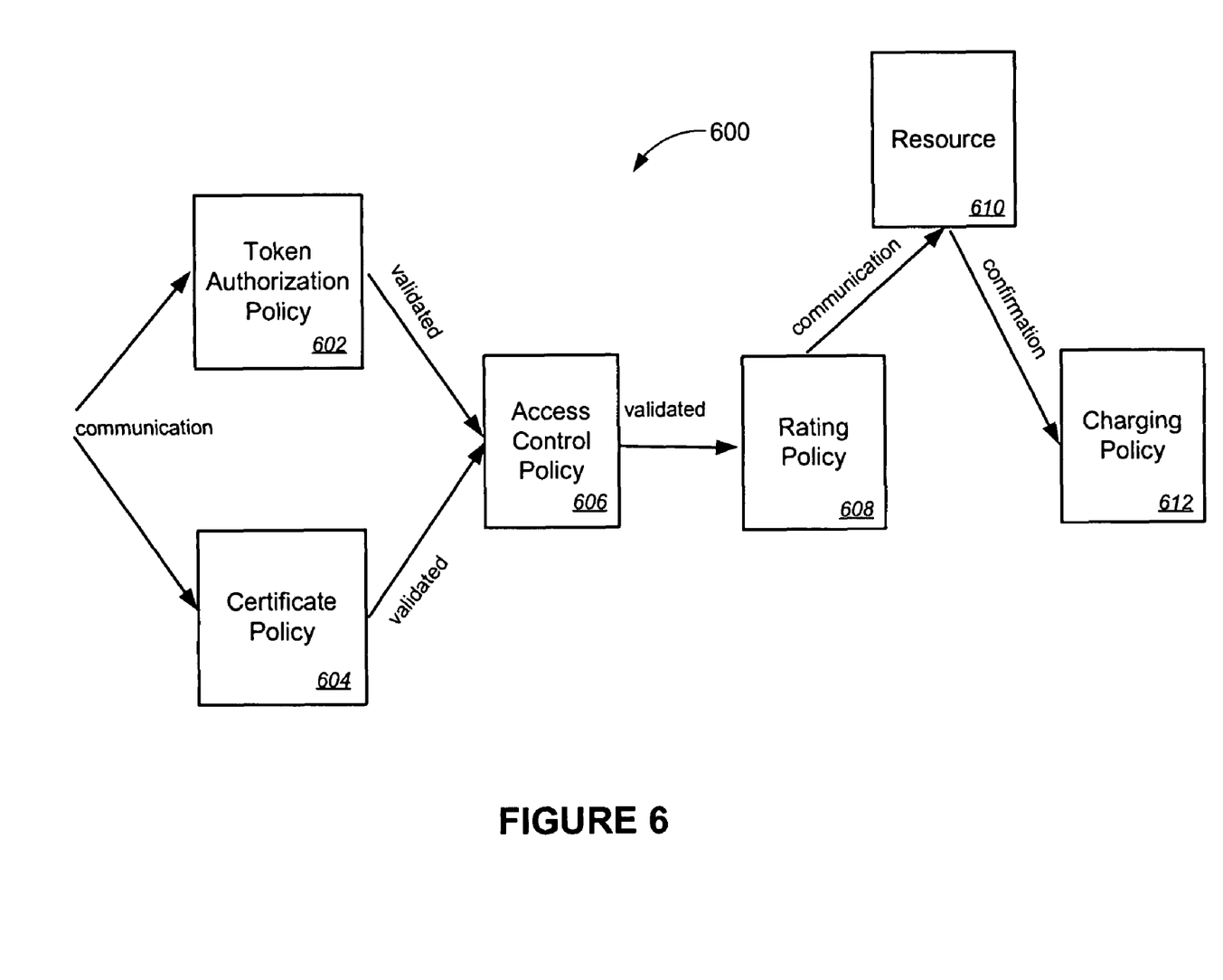
FIG. 6 is a block diagram illustrating an exemplary embodiment of applying policies to a communication.

FIG. 6 illustrates an exemplary flow diagram of enforcing policies on a communication. Policy enforcement may be done by framework 102 or a different framework. A communication, such as a web services message (e.g., a SOAP message) is received. The communication may be received or intercepted from a client requesting access to a billable resource. A workflow engine, script interpreter, or other type of logic in an execution environment, enforces a variety of different types of policies 602, 604, 606, 608, 612 on the communication by invoking the policies. For instance, a BPEL workflow engine may be used to invoke policies as part of a commands in an execution flow or sequence.

As shown in FIG. 6, logic responsible for processing the communication (e.g., a workflow engine at a gateway or proxy to resource 610) may first invoke a token authorization policy 602 and a certificate policy 604 to authenticate the requester. Appropriate parameters may be passed to the policy by the logic as part of the invocation. For instance, the token policy may be passed a token as a parameter. The authentication policies 602, 604 may then each evaluate one or more conditions and/or execute one or more actions to authenticate the user. An indication may then be returned to the logic by each of the policies 602, 604 whether the respective policy 602, 604 evaluation (execution) completed successfully. As illustrated in FIG. 3, the token authorization policy 602 and the certificate policy 604 may at least partially execute simultaneously. By way of example, the policies 602, 604 may be invoked as part of a BPEL flow.

If both of the authentication policies complete successfully, the policies are validated. Additional policies 606, 608, 612 may then be applied to the communication. For example an access control policy 606 may be invoked to authorize the requester to access a service provided by resource 610. If the authorization policy completes successfully, it is validated. A rating policy 608 may then be invoked to evaluate conditions and execute actions to bill appropriately for the communication. For example, the rating policy 608 may include conditions and actions to determine the requester is associated with an account in good standing, to determine the rate to apply to the communication request, and to reserve a billing amount for the communication. Other conditions and actions may also be included in the rating policy 608.

Upon validation of the rating policy 608, the communication may be passed to resource 610. Resource 610 may then process the communication to satisfy the request for access or services. At some point, the billable resource 610 may issue a confirmation to commit the billing transaction which may have been initiated by the rating policy 608. Charging policy

612 may then be invoked to evaluate conditions and execute actions to commit the billing transaction.

It should be appreciated that the policies illustrated in FIG. 6 are exemplary in nature. In alternate embodiments, additional, different or fewer policies may be applied to a communication to fulfill the policy requirements for resource 610. As one example of a variation, the rating policy 608 may not make a reservation of a billing amount, but may instead create a final billing record for the communication. As another example, resource 610 may issue requests to increase the reserved billing amount during the processing of the communication. These requests may be processed by logic by invoking rating policy 608 a second time or invoking another appropriate billing policy.

In FIG. 6, the policies 602, 604, 606, 608, 612 all executed successfully and were validated. In some embodiments, in the event a policy does not execute successfully, error recovery may be applied. For example, a BPEL fault handler may specify actions that occur if a policy 602, 604, 606, 608, 612 does not execute successfully.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
    intercepting, at a communication interface of a framework, a communication from a web services provider to register a web service interface description with a register;
    obtaining, at the framework, the web service interface description;
    determining, at the framework, at least one policy associated with the web services provider;
    for each of the determined policies, determining, at the framework, one or more policy parameters associated with the respective policy;
    generating, via the communications interface of the framework, an update to the web service interface description as a result of enforcement of the at least one policy;
    determining, at runtime by the communications interface of the framework, changes to be made to the web service interface description based on the update;
    updating the web service interface description by adding the one or more policy parameters to the web service interface description, wherein the one or more policy parameters are configured to enforce resource access for the web service interface; and
    transmitting, from the communication interface of the framework to the register, the updated web service interface description and the policy parameters, wherein the transmitting the updated web service interface description and the policy parameters comprises:
        modifying the updated web service interface description to include the policy parameters, wherein modifying the updated web service interface description comprises modifying a web services discover response to include the policy parameters, and wherein the modifying of the web services discover response comprises adding the policy parameters to a header of the web services discover response; and
        transmitting the modified updated web service interface description to a requester.

2. The method of claim 1, wherein determining one or more policy parameters comprises determining one or more policy parameters used by an authentication policy associated with the web services provider.

3. The method of claim 1, wherein determining one or more policy parameters comprises determining one or more policy parameters used by a billing policy associated with the web services provider.

4. The method of claim 1, wherein determining the one or more policy parameters comprises determining one or more policy parameters used by a prioritization policy associated with the web services provider.

5. A system for applying policies to requests to register a web services provider, comprising:
    a processor;
    a communication interface configured to intercept a communication from the web services provider to register a web service interface description with a register; and
    memory including instructions that, when executed by the processor, provide logic to obtain the web service interface description, determine at least one policy associated with the web services provider, to determine one or more policy parameters associated with each of the determined policies, to generate an update to the web service interface description as a result of enforcement of the at least one policy, to determine, at runtime changes to be made to the web service interface description based on the update, and to update the web service interface description by adding the one or more policy parameters to the web service interface description, wherein the one or more policy parameters are configured to enforce resource access for the web service interface,
    wherein the communications interface is further configured to transmit the updated web service interface description and the policy parameters to the register, and wherein the transmitting the updated web service interface description and the policy parameters comprises:
        modifying the updated web service interface description to include the policy parameters, wherein modifying the updated web service interface description comprises modifying a web services discover response to include the policy parameters, and wherein the modifying of the web services discover response comprises adding the policy parameters to a header of the web services discover response; and
        transmitting the modified updated web service interface description to a requester.

6. The system of claim 5, further comprising the at least one policy, communicatively coupled with the logic, and wherein the logic determines the policy parameters by obtaining the policy parameters from the at least one policy.

7. The system of claim 5, further comprising a register associated with the web services provider, the logic to obtain the web services provider description from the register.

8. A non-transitory computer-readable medium having sets of instructions stored thereon which, when executed by a computer, cause the computer to:

intercept, at a communication interface of a framework, a communication from a web services provider to register a web service interface description with a register; obtain, at the framework, the web service interface description; determine, at the framework, at least one policy associated with the web services provider;

for each of the determined policies, determine, at the framework, one or more policy parameters associated with the respective policy;

generate, via the communications interface of the framework, an update to the web service interface description as a result of enforcement of the at least one policy;

determine, at runtime by the communications interface of the framework, changes to be made to the web service interface description based on the update;

update the web service interface description by adding the one or more policy parameters to the web service interface description, wherein the one or more policy parameters are configured to enforce resource access for the web service interface; and transmit, from the communication interface of the framework to the register, the updated web service interface description and the policy parameters, wherein the transmitting the updated web service interface description and the policy parameters comprises:

modifying the updated web service interface description to include the policy parameters, wherein modifying the updated web service interface description comprises modifying a web services discover response to include the policy parameters, and wherein the modifying of the web services discover response comprises adding the policy parameters to a header of the web services discover response; and transmitting the modified updated web service interface description to a requester.

* * * * *

UNITED STATES PATENT AND TRADEMARK OFFICE
CERTIFICATE OF CORRECTION

| | |
|---|---|
| PATENT NO. | : 8,321,498 B2 |
| APPLICATION NO. | : 11/070317 |
| DATED | : November 27, 2012 |
| INVENTOR(S) | : Maes |

It is certified that error appears in the above-identified patent and that said Letters Patent is hereby corrected as shown below:

Title Page, item (56);

On page 3, in column 2, under "Other Publications", line 10, delete "hhtp://" and insert -- http:// --, therefor.

On page 4, in column 1, under "Other Publications", line 38, after "2008," delete "Final".

On page 4, in column 2, under "Other Publications", line 66, delete "Dec. 6, 2007," and insert -- Dec. 27, 2004, --, therefor.

In column 3, line 20, delete "2004 ," and insert -- 2004, --, therefor.

In column 4, line 52, delete "2004 ," and insert -- 2004, --, therefor.

In column 5, line 26, delete "235 ," and insert -- 235, --, therefor.

Signed and Sealed this
Twelfth Day of March, 2013

Teresa Stanek Rea
*Acting Director of the United States Patent and Trademark Office*